(12) United States Patent
Talpe (10) Patent No.: US 11,821,445 B2
(45) Date of Patent: Nov. 21, 2023

(54) FIXTURE SET

(71) Applicant: LOCINOX, Waregem (BE)

(72) Inventor: Joseph Talpe, Heestert-Zwevegem (BE)

(73) Assignee: LOCINOX, Waregem (BE)

( * ) Notice: Subject to any disclaimer, the term of this patent is extended or adjusted under 35 U.S.C. 154(b) by 539 days.

(21) Appl. No.: 17/059,164

(22) PCT Filed: May 23, 2019

(86) PCT No.: PCT/EP2019/063288
§ 371 (c)(1),
(2) Date: Nov. 25, 2020

(87) PCT Pub. No.: WO2019/228896
PCT Pub. Date: Dec. 5, 2019

(65) Prior Publication Data
US 2021/0215182 A1 Jul. 15, 2021

(30) Foreign Application Priority Data
May 31, 2018 (EP) ..................... 18175378

(51) Int. Cl.
*F16B 13/08* (2006.01)
*F16B 33/00* (2006.01)
*F16B 41/00* (2006.01)

(52) U.S. Cl.
CPC ........ *F16B 13/0833* (2013.01); *F16B 33/002* (2013.01); *F16B 41/002* (2013.01)

(58) Field of Classification Search
CPC ......................... F16B 13/0833; F16B 13/0858; F16B 13/066; F16B 19/1063; F16B 33/002; F16B 41/002; E05B 1/0015; E05B 9/08

(Continued)

(56) References Cited

U.S. PATENT DOCUMENTS 3,593,612 A * 7/1971 Schulze ................. F16B 13/02
411/15
3,739,684 A * 6/1973 Vitkevich ............. F16B 13/124
411/49

(Continued)

FOREIGN PATENT DOCUMENTS

| FR | 2919904 A1 | 2/2009 |
|---|---|---|
| GB | 1319516 A | 6/1973 |
| WO | 2007009998 A1 | 1/2007 |

OTHER PUBLICATIONS

International Search Report dated Aug. 5, 2019, issued in corresponding International Application No. PCT/EP2019/063288, filed May 23, 2019, 3 pages.

(Continued)

*Primary Examiner* — Victor D Batson
*Assistant Examiner* — Carl J Carlson
(74) *Attorney, Agent, or Firm* — CHRISTENSEN O'CONNOR JOHNSON KINDNESS PLLC (57) ABSTRACT

A fixture set for fixing an accessory to a wall includes a bolt; a splitter having a sleeve portion and a wedge portion; and a metal anchor configured to be screwed to the bolt and having radially expandable arms configured to slide along surfaces of the wedge portion when the anchor is urged to slide in a first direction. The arms have a free end configured to lock the anchor against the wall upon radial expansion of the arms. The splitter has a catch situated entirely within minimum bounding cylinder of the sleeve portion. The free end of a respective arm is barbed and configured to be caught in the catch when the anchor is urged to slide in a second direction, opposite to the first direction, after having slid the anchor onto the splitter in the first direction with the barbed free end having passed the catch.

20 Claims, 3 Drawing Sheets (58) Field of Classification Search
USPC ......... 411/28, 34, 35, 45, 46, 47, 48, 49, 50, 411/51, 52, 53, 54, 340
See application file for complete search history.

(56) References Cited

U.S. PATENT DOCUMENTS

| | | | | |
|---|---|---|---|---|
| 4,284,378 A * | 8/1981 | Mizusawa | ............. | F16B 37/043 411/21 |
| 7,780,387 B2 * | 8/2010 | Talpe | ................. | F16B 13/0833 411/340 |
| 8,333,048 B2 * | 12/2012 | Talpe | ................... | F16B 33/002 411/340 |
| 9,145,908 B2 * | 9/2015 | Gill | ......................... | F16B 35/02 |
| 9,709,085 B2 * | 7/2017 | McClure | .............. | F16B 19/109 |

OTHER PUBLICATIONS

Written Opinion of the International Searching Authority dated Aug. 5, 2019, issued in corresponding International Application No. PCT/EP2019/063288, filed May 23, 2019, 8 pages.

* cited by examiner

FIXTURE SET

The present invention relates to a fixture set for fixing an accessory part to a tubular metal profile having a wall with a thickness, particularly, between 0.5 mm and 5 mm, preferably between 1 mm and 3 mm, which wall has a front surface, a back surface and a circular opening therethrough. The fixture set comprises: a bolt having a bolt head and an at least partially threaded shaft configured to be inserted through the opening in the wall; a splitter which has a geometrical longitudinal axis and which is sized to be partially axially insertable in said opening in the wall, the splitter comprising: a radially projecting portion configured to abut against said front surface; a sleeve portion extending axially away from said radially projecting portion and configured to fit within said opening, said sleeve portion having a minimum bounding cylinder; a wedge portion extending axially away from said sleeve portion and having at least two wedge surfaces which have a decreasing diameter away from said sleeve portion, the sleeve portion and the wedge portion having a total length measured parallel to said longitudinal axis between said radially projecting portion and the free end of said wedge portion; and a throughhole by which the splitter is configured to be slid onto the shaft of the bolt towards the bolt head in a first direction substantially parallel to said longitudinal axis; and an integrally formed metal anchor sized to be axially insertable through said opening in the wall, the anchor comprising a threaded part configured to be screwed to the bolt shaft thread and at least two radially expandable arms extending axially away from said threaded part and configured to slide along a respective one of said at least two wedge surfaces when said anchor is urged to slide in said first direction, in particular by tightening said bolt, said arms having a free end configured to lock the anchor against said back surface upon radial expansion of said arms, which radial expansion is caused by deformation of the metal anchor, the splitter and the anchor further comprising mutually interlockable structures for substantially restricting rotation of said anchor relative to said splitter.

Such a fixture set is described in WO-A-2007/009998, where it is used to fix a lock bolt keeper to a tubular post. In the known fixture set, the radially projecting portion of the splitter is formed by a flange with a cylindrical sleeve protruding therefrom. The diameter of the sleeve corresponds to the diameter of the opening in a side wall of the post. A wedge portion with four wedge surfaces extends axially from the cylindrical sleeve, which wedge surfaces are separated by radially protruding ridges. The anchor is generally formed by a hollow cylinder with a threaded end part with four parallel slits forming the arms that slide over respective wedge surfaces. The ridges and slits are so dimensioned that the arms are guided between the ridges thereby ensuring that the splitter and the anchor substantially cannot rotate with respect to one another. As described in WO-A-2007/009998, the arms of the anchor are radially expanded when sliding along the wedge surfaces when tightening the bolt during fixing the accessory part to the post. The radial expansion is caused by a deformation of the anchor, in particular the area where the slits end, i.e. where the arms connect with the threaded part, is deformed. The bolt is tightened until the free ends of the arms contact the back side of the wall of the post thereby fixing the anchor, and thus the bolt with the accessory part, to the post.

The fixture set described in WO-A-2007/009998 is put on the market under the name "Quick-Fix" by the applicant. The fixture set has a tensile strength of at least 10 kN and is suitable for hollow metal posts having a wall thickness between 0.5 and 5 mm. The tensile strength is the result from the materials used in manufacturing the bolt and the anchor, in particular sufficiently rigid metals or metal alloys are used, preferably stainless steel as the fixture set is typically used outdoors. Furthermore, the shape of the arms, namely the transverse curve in the arms, also aids in the stiffness or rigidity of the arms since such a gutter-shape is not easily bent. In order to reduce the costs of the metal anchor, the anchor is not made of spring steel and returns only to a limited extent, in particular for somewhat less than 30%, to its original shape when being removed from the splitter. The free ends of the arms of the anchor each only contract for about 0.6 mm (i.e. the diameter of the anchor is reduced with 1.2 mm) when the anchor is removed from the splitter after having applied the fixture set onto a wall having a thickness of 2 mm. In view of the force required to bend the arms, the splitter is typically also manufactured from metal or metal alloys, but a plastic splitter is also feasible.

In practice it has been found that the bolt in the known fixture set should not be removed after having fixed the accessory part to the post. Such a removal may however be necessary for several reasons, such as a replacement of the accessory part or, in case of a lock bolt keeper, an adjustment of a strike plate with respect to the accessory part for which the accessory part needs to be at least partially loosened with respect to the post. Specifically, if the bolt is removed, and especially when a removed bolt is inserted again in the anchor, the anchor may come free from the splitter and may thus fall down into the interior of the post and will no longer be useable to reaffix the bolt to the post. Consequently, at least a new anchor has to be inserted in the opening in the post to reaffix the accessory part.

This problem is addressed in GB-A-1319516 which generally relates to a cavity fixing device for use in thin-walled plasterboard constructions and for use in blind holes formed in a concrete wall. The fixture set disclosed in GB-A-1319516 does not used a relatively rigid and inelastic metal anchor but includes a more flexible plastic anchor, in particular manufactured from nylon or polypropylene. Such a plastic material has a much smaller yield strength than the metal used to produce the anchor in the Quick-Fix device and is therefore not suitable to provide high tensile strengths, in particular tensile strengths of at least 10 kN. The anchor has four flexible arms that can flex moreover around a circumferential channel near the threaded part of the anchor. In other words, the channel forms a locally weakened area around which the arms can easily be rotated thereby radially expanding or contracting. An expander, i.e. a splitter, is provided with a frustroconical surface which acts as a wedge surface for the arms of the anchor. The expander is provided with a first collar near the end of the frustroconical surface that interlocks with circumferential grooves in the free ends of the arms such that the anchor is held against the expander before use, i.e. the anchor cannot get axially separated from the expander before use. The expander is provided with a second outwardly projecting collar at the transition between the cylindrical surface and the frustroconical surface, the collar having a diameter that is nearly equal to the diameter of the opening in the wall and the cylindrical surface thus having a smaller diameter. Upon expansion of the arms due to the frustroconical surface when tightening the bolt the arms snap into engagement with the second collar and are then further expanded until the free ends of the arms lock against the back surface of the wall. In case the bolt is removed after initial use, the arms of the plastic anchor are so resilient that they radially contract until the circumferential grooves again interlock with the second collar.

A downside of the fixture set disclosed in GB-A-1319516 is that the second collar necessitates a cylindrical surface with a decreased diameter with respect to the diameter of the opening in the wall, meaning that there is a leeway between the sleeve and the wall which is undesirable. Moreover, a larger hole is more difficult to drill in the wall.

Furthermore, the use of flexible, plastic arms in combination with the locally weakened area due to the circumferential channel at the bases thereof limits the maximal tensile strength of the fixture set, which is typically only used to fix an article against plaster boards that cannot resist themselves to high tensile stresses.

It is an object of the present invention to provide a fixture set which comprises an anchor with relatively stiff arms to provide a high tensile strength, in particular a tensile strength of 10 kN when being fixed to the wall, and which is moreover provided to prevent release of the anchor from the splitter when removing the bolt.

This object is achieved according to the invention in that the splitter further comprises at least one catch which is situated entirely within said minimum bounding cylinder, said catch comprising a radially extending wall having a top which is separated from said radially projecting portion by an axial distance measured parallel to said longitudinal axis and from said geometrical longitudinal axis by a radial distance measured perpendicular to said longitudinal axis, said axial distance being at most 60% of said length and said radial distance being at least 85% of the radius of said minimum bounding cylinder, and in that the free end of a respective one of said at least two arms is barbed, the barbed free end being configured to be caught in said catch, in particular by the barbed free end axially engaging said radially extending wall, when the anchor is urged to slide in a second direction, opposite to said first direction, after having slid said anchor onto said splitter in said first direction with said barbed free end having passed said catch.

This object is also achieved according to the invention in that the splitter further comprises at least one catch, in particular, situated entirely within said minimum bounding cylinder, said catch comprising a radially extending wall having a top which is separated from said radially projecting portion by an axial distance measured parallel to said longitudinal axis and from said geometrical longitudinal axis by a radial distance measured perpendicular to said longitudinal axis, said axial distance being at most 8 mm, preferably at most 7 mm and said radial distance being at least 5 mm, preferably at least 6 mm, in that the free end of a respective one of said at least two arms is barbed, the barbed free end being configured to be caught in said catch, in particular by the barbed free end axially engaging said radially extending wall, when the anchor is urged to slide in a second direction, opposite to said first direction, after having slid said anchor onto said splitter in said first direction with said barbed free end having passed said catch, and in that, when said wall 1 has a thickness of about 2 mm, said splitter is configured to radially expand said barbed free end over a distance from said longitudinal axis 17 of at most 1.5 mm, preferably at most 1 mm, when the anchor is moved from its axial position wherein the barbed free end is caught in said catch 22 to its axial position wherein the anchor 7 is locked against said back surface.

By having an integrally formed metal anchor similar to the known fixture set disclosed in WO-A-2007/009998, the tensile strength is substantially the same. In other words, the tensile strength of the fixture set according to the present invention is not significantly decreased with respect to the fixture set disclosed in WO-A-2007/009998.

Although the arms of the metal anchor have a low elasticity when compared to plastic arms, it has been surprisingly found that the metal arm with the barbed free end is able to sufficiently radially contract when loosening the bolt and/or when the anchor is pushed off the splitter to get caught in a catch having a wall with a top which is separated from said radially projecting portion by an axial distance of at most 60% of the length of the splitter and by a radial distance of at least 85% of the radius of the minimum bounding cylinder. Similarly, it has been found that, when said fixture set is used to fix the accessory part to a wall having a thickness of about 2 mm, having a barbed free end configured to radially expand at most 1.5 mm between passing said catch and locking the anchor against said back surface in combination with said axial distance being at most 8 mm and said radial distance being at least 5 mm also leads to the metal arm with the barbed free end being able to sufficiently radially contract when loosening the bolt and/or when the anchor is pushed off the splitter to get caught in the catch. In other words, the specific choice of location of the top of the wall of the catch ensures that the metal anchor is caught on the splitter when removing the bolt notwithstanding the quite small contraction of the arms of the anchor. As such, contrary to the fixture set disclosed in WO-A-2007/009998, the anchor remains affixed to the splitter when after having removing the bolt it is reinserted into the anchor, meaning that the anchor is not lost and can be reused when reinserting the bolt to reaffix the accessory part.

Moreover, the remaining distance between the catch and the free end of the wedge portion provides a sufficient length of the wedge surfaces to enable to wedge surfaces to expand the arms of the anchor notwithstanding the relatively high stiffness of the arms. In this respect, it should be noted that the total length of the splitter and the anchor screwed onto the bolt without being slid onto the splitter is limited by the inner dimensions of the hollow post wherein the splitter and anchor have to be inserted, which inner dimensions are typically standardized to be at most 60 mm, 50 mm or 40 mm.

Furthermore, the catch is preferably entirely located within the minimum bounding cylinder the sleeve portion can be designed in such a way that its minimum bounding cylinder has a radius that is as close as possible to the radius of the opening in the wall. In other words, the leeway between the sleeve portion and the opening in the wall can be kept to the bare minimum needed to take into account production tolerances. Minimising this leeway is advantageous as this also results in less leeway to move the accessory part with respect to the wall. Additionally, the minimised leeway means there is less room for water and/or dirt to enter into the interior of the support. The overall strength of the splitter is also increased by being able to design the sleeve portion in such a way that its minimum bounding cylinder has a radius that is as close as possible to the radius of the opening in the wall. The size of the opening in the wall can also be kept to a minimum, thus making drilling of the opening in the wall easier.

In an embodiment of the present invention, the anchor is made of a metal which has an elasticity such that when the barbed free ends of the anchor are each expanded over a distance of 2 mm from said axial longitudinal axis, they contract over at most 40%, in particular over at most 35% and more in particular over at most 30% of this distance when they are released. An advantage of such a metal is that it does not have to be a so-called spring metal, which is much more expensive than metals which are less elastic.

In an embodiment of the present invention, the anchor is made of a metal which has a yield strength of at most 400 MPa, preferably at most 300 MPa and preferably at most 250 MPa, said metal having a yield strength of at least 50 MPa, more preferably at least than 100 MPa, advantageously at least 150 MPa and more advantageously at least 200 MPa.

It has been found that manufacturing the anchor from a metal having such a yield strength enables the arms having the barbed free ends to apply a sufficient strength when the barbed free ends are caught in their respective catches. In other words, when caught in the catch, the arms keep applying a force against the splitter, i.e. a force directed in the radial direction. This force ensures that the interlocking catches and barbs do not accidently release, for example when the bolt is entirely removed and then inserted.

In an embodiment of the present invention, said radial distance is at least 87% of the radius of said minimum bounding cylinder, preferably at least 90% of the radius of said minimum bounding cylinder and more preferably at least 92% of the radius of said minimum bounding cylinder. In particular, said radial distance is equal to the radius of said minimum bounding cylinder, said radial distance being preferably about 7 mm.

Increasing said radial distance means that the top of the wall is located more radially outward, meaning that the radial contraction needed by the arms is decreased. Consequently, a stiffer, and thus a stronger, anchor may be used which increases the overall tensile strength of the fixture set.

In an embodiment of the present invention, said axial distance is at least 15% of said length, preferably at least 25% of said length, more preferably at least 30% of said length and most preferably at least 35% of said length and in that said axial distance is preferably at most 50% of said length and more preferably at most 45% of said length, said axial distance being in particular about 5 mm.

As the radially projecting portion of the splitter is located on the front side of the wall whilst the anchor is screwed with the free ends of its arms against the back side of the wall, the axial distance between the top of the wall of the catch and the radially projecting portion of the splitter provides the required space for walls having a thickness which may be comprised between about 0.5 and about 5 mm and for the barbs provided on the free extremities of the arms of the anchor to pass their catch before locking against the back wall. On the other hand, a smaller axial distance between the top of the wall of the catch and the radially projecting portion of the splitter will require a smaller radial contraction of the arms in order to get caught with their barbed ends in the catches on the splitter. As such, it has been found that an axial distance between 35% and 45% of said length, in particular about 5 mm, are most preferred without sacrificing on the rigidity of the arms of the anchor.

In an embodiment of the present invention, said top is located at or near the transition between said sleeve portion and said wedge portion.

It has been found that such a placement of the top minimises the required radial contraction of the arms, meaning that their stiffness may be maximised.

In an embodiment of the present invention, each arm has a barbed free end which are each arranged to cooperate with a catch which is, in particular, situated entirely within said minimum bounding cylinder, each catch comprising a radially extending wall having a top which is separated from said radially projecting portion by an axial distance measured parallel to said longitudinal axis and from said geometrical longitudinal axis by a radial distance measured perpendicular to said longitudinal axis, said axial distance being at most 60% of said length, said axial distance being preferably at most 8 mm and more preferably at most 7 mm, said radial distance being at least 85% of the radius of said minimum bounding cylinder, said radial distance being preferably at least 5 mm and more preferably at least 6 mm.

Providing a catch for each arm of the anchor improves the robustness and/or reliability of the fixture set. For each arm a separate catch may be provided or one catch, for example a circumferential groove, may act as a common catch for all of the arms.

The invention will be further explained by means of the following description and the appended figures.

The present invention will be described with respect to particular embodiments and with reference to certain drawings but the invention is not limited thereto but only by the claims.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

Figure 1:
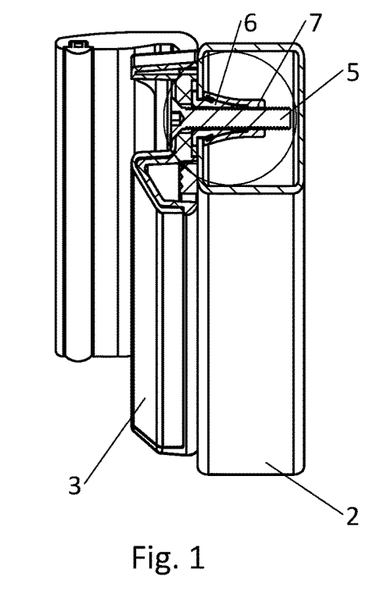
FIG. 1 is a side partly-cut-away view of a fixture set according to the present invention used to fix an accessory part, in particular a lock bolt door keeper, to a wall of a hollow post.

FIG. 1 illustrates an example of a fixture set according to the present invention used to fix an accessory part 3 onto a wall 1 of a hollow metal post or frame 2. The accessory part 3 is, in this non-limiting example, a door lock bolt keeper, which is fixed against the front surface of one of the walls 1 of the hollow frame 2. The accessory part 3 is fixed to the hollow frame 1 by means of two fixture sets which extend through an opening 4 through said wall 1 as shown in more detail in FIG. 2. Each of the fixture sets comprises a standard externally threaded bolt 5, a splitter 6, and an internally threaded anchor 7. The bolt 5 has an at least partly threaded shaft 9 configured to be screwed into a corresponding internal screw thread 27 of the anchor 7. The anchor 7, in its unexpanded form, can be inserted in the circular hole 4 drilled in the wall 1 of the hollow frame 2, whilst the splitter 6 can only be partially inserted in this hole 4. Moreover, the anchor 7, in its expanded position, is held by the bolt 5, by means of the screw threads 9, 27, against the inside surface of the wall 1, thus anchoring the whole fixture set together with the accessory part to the post or frame 2.

The post 2 as depicted in FIG. 1 typically has an external width of about 4 cm to about 6 cm, in particular an external width of about 4, about 5 or about 6 cm. As the anchor 7 needs to be inserted in the unexpanded form, the combined length of the anchor 4 and the portion of the splitter 6 within the post must be lower than the available space within the post 2. Consequently, the anchor 7, in its unexpanded form, typically has a length of at most 3 cm and preferably at most 2.5 cm.

Figure 2:
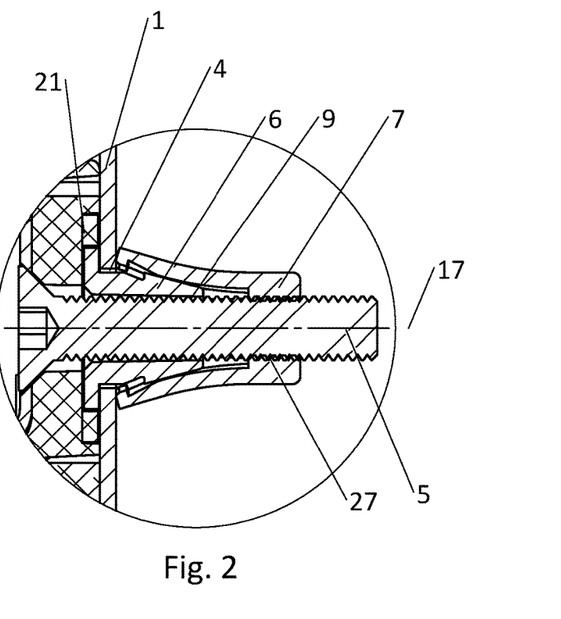
FIG. 2 shows a detail view of FIG. 1.
Figures 3, 4:
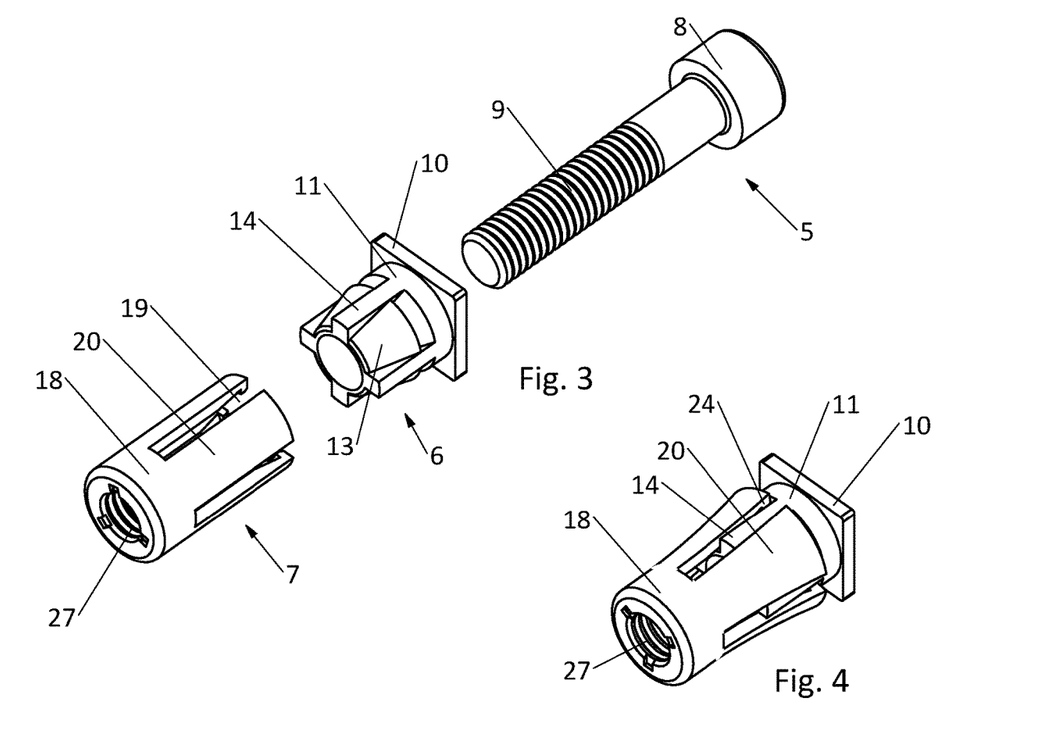
FIG. 3 shows an exploded view of the fixture set of FIG. 1.
FIG. 4 shows a perspective view of the fixture set of FIG. 1 with the bolt having been omitted and the anchor being caught in the splitter.
Figure 6:
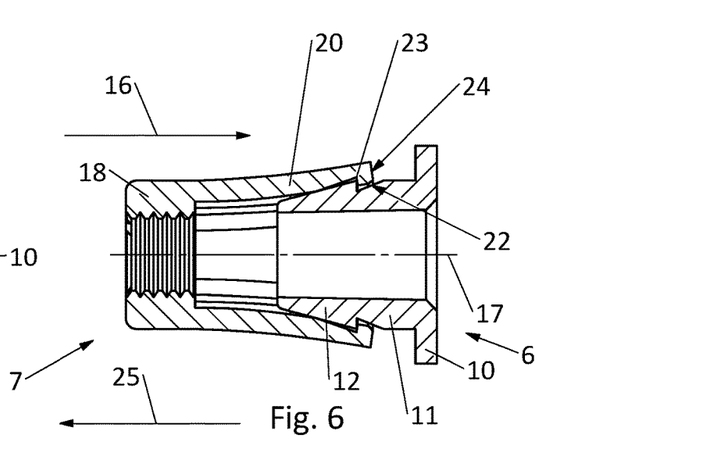
FIG. 6 shows an axial cross-section through the fixture set along line VI in FIG. 5.
Figure 7:
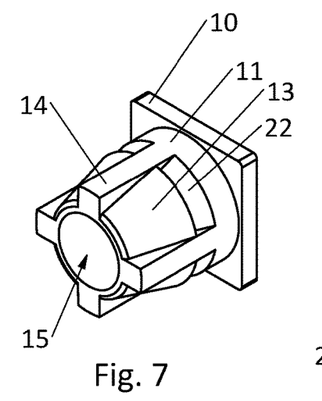
FIGS. 7 to 9 show differently oriented perspective views of the splitter of the fixture set of FIG. 1.
Figure 8:
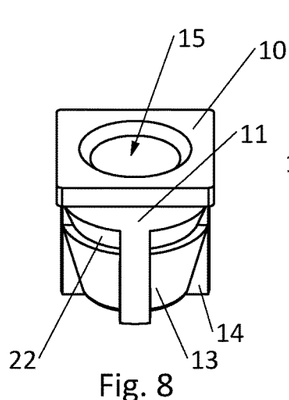
Figure 9:
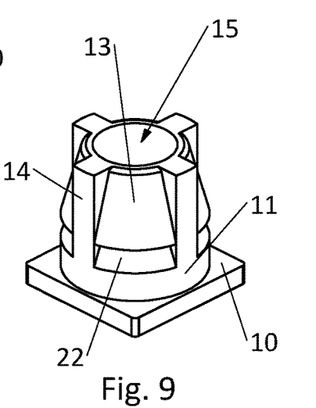
Figure 10:
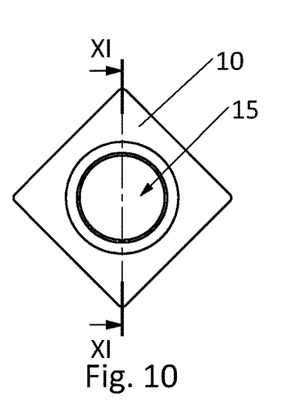
FIG. 10 shows a front view of the splitter of FIG. 7.

FIG. 3 shows an exploded view of the elements of the fixture set before assembly. The bolt 5 has a bolt head 8 which is provided onto the at least partly threaded shaft 9. The splitter 6 comprises a non-circular, in this case square, radially projecting head 10 which is larger than the openings 4 in the hollow frame 2. In this way the head of the splitter 6 forms a flange 10 which is configured to abut against the front surface of the wall 2 as shown in FIGS. 1 and 2. The splitter 6 further has a sleeve portion 11 extending axially away from the flange 10 and configured to fit within said opening 4 as shown in FIGS. 1 and 2. In the appended figures, the sleeve portion 11 has a circular cross-section, but it will be readily appreciated that other cross-sectional shapes are possible (e.g. a hexagonal cross-section), although a circular cross-section is preferred for achieving a maximum strength. The sleeve portion 11 transitions into a wedge portion 12 having conical, in particular frustroconical, wedge surfaces 13 separated by ribs 14 as indicated in FIGS. 7 to 9. The splitter 6 is also provided with a through-hole 15 by which the splitter 6 is configured to be slid onto the shaft 9 of the bolt 5 towards the bolt head 8 in a first direction (indicated with arrow 16 in FIG. 6) substantially parallel to the longitudinal axis 17 of the through-hole 15.

The illustrated anchor 7 globally consists of a hollow cylindrical piece comprising a threaded bottom part 18 with inner screw thread 27 and with four slits 19 forming arms 20 which can be radially expanded by means of the splitter 6.

The splitter 6 and anchor 7 are shaped so that, when urged against each other, the ribs 14 of the splitter 6 engage the slits 19 of the anchor 7, substantially restricting rotation of the anchor 7 relative to the splitter 6, and the conical wedge surfaces 13 of the splitter 6 force the expandable arms 20 of the anchor 7 radially outwards, thus expanding the outer diameter of the anchor 7 to a size lager than the diameter of the opening 4 in the hollow frame 2 as shown in detail in FIG. 2. In practice, it turns out that the radial expansion of the arms 20 is caused by a deformation of the metal anchor 7. In particular the area where the slits 19 end, i.e. where arms 20 connect with the bottom threaded part 18 is deformed as illustrated in FIG. 2.

As illustrated in FIGS. 1 and 2, the back side of the accessory part 3 comprises a square recess 21 arranged to receive the square head 10 of the splitter 6. When the square splitter head 10 is inserted into the recess 21, their form-locking engagement substantially restricts rotation of the splitter 6 relative to the accessory part 3. Although in FIGS. 1 and 2, the recess 21 is illustrated as square, any non-circular form that would restrict rotation of the splitter head 10 could be considered. For instance, a single elongated groove could accommodate several splitter heads 10 and hold them against rotation. An advantage of making the recess 21 in the form of an elongated groove is that such a groove can easily be obtained when producing the accessory part by an extrusion process.

Instead of using a form-locking device for restricting rotation of the splitter 6 with respect to the accessory part 3, it is also possible to restrict the rotation of the splitter 6 relative to the accessory part 3 with a solid connection between them. In other words, one or more splitters 6 are integrally formed (in one piece) with the accessory part 3. The splitters and the accessory part may in particular be injection moulded from a plastic material or cast moulded from a metal or a metal alloy.

For fixing the accessory part 3 to the hollow frame 2, the bolts 5 are first introduced through openings in the accessory part 3, and then assembled with one or more splitters 6 and a corresponding number of anchors 7, the square heads 10 of the splitters 6 thereby fit into the square recess 21 or elongated groove of the accessory part 3. The accessory part 3 with the bolts 5, splitters 6 and anchors 7 is then placed onto the front surface of the wall 1 of the frame 2, with the fixture set introduced through the corresponding holes 4 in the wall 2. As may be readily perceived from FIG. 2, when tightening the bolts 5, the anchors 7 will be held against rotation by their slits 19 in engagement with the ribs 14 of the splitters 6, and the splitters 6 will be themselves held against rotation by the splitter heads 10 in engagement with the recesses 21 of the accessory part 3. As a consequence, the radially expandable arms 20 of the anchor 7 will be pushed against the conical wedge surfaces 13 of the splitter 6 and cause these to expand outwards and ultimately tightly fix themselves against the back side of the wall 1 of the hollow frame 2 as shown in FIG. 2.

Figure 5:
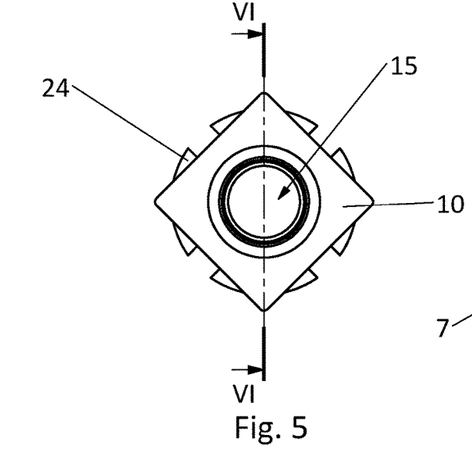
FIG. 5 shows a front view the anchor caught in the splitter of FIG. 4.

According to the present invention, the splitter 6 further comprises at least one catch 22, preferably a same number as catches 22 as the number of wedge surfaces 13 or arms 20, i.e. four catches 22 in the appended figures. Each catch 22 is situated entirely within a minimum bounding cylinder 27 around the sleeve portion 11, which minimum bounding cylinder 27 is coaxial with the longitudinal axis 17 of the through-hole 15 and has a diameter D indicated in FIGS. 11 and 16. The one or more catches 22 are configured to cooperate with a corresponding number of barbs 23 in the free ends 24 of the arms 20 when the bolt 5 is unscrewed from the anchor 7. Specifically, as illustrated in FIGS. 4 to 6, when the bolt 5 is removed from the anchor (i.e. when the anchor 7 is urged to slide in a second direction (indicated with arrow 25 in FIG. 6), after having slid the anchor 7 onto the splitter 6 in the first direction 16 with said barbed free end 24 having passed said catch 22, the barbed free end 24 interlocks with the catch 22 thereby preventing the anchor 7 becoming detached from the splitter 6 as illustrated in FIGS. 4 to 6.

Such a catching action is possible even considering the low elasticity of the metal arms since the catch 22 is placed in a specific area of the splitter 6. Specifically, according to the invention, the catch 22 comprises a radially extending wall 25 having a top 26 which is separated from said radially projecting portion 10 by an axial distance I (indicated in FIGS. 11 and 16) measured parallel to said longitudinal axis 17 of at most 60% of the length L of the splitter 6 (also indicated in FIGS. 11 and 16), in particular of the combined total length L of the sleeve portion 11 and the wedge portion 12. Furthermore, the top 26 is separated from said geometrical longitudinal axis 17 by a radial distance w (indicated in FIG. 16) measured perpendicular to said longitudinal axis 17 of at least 85% of the radius R of the minimum bounding cylinder 27 (indicated in FIGS. 11 and 16). Alternatively, according to the invention, when the fixture set is applied onto a wall having a thickness of about 2 mm, said splitter is configured to radially expand said barbed free end over a distance from said longitudinal axis 17 of at most 1.5 mm, preferably at most 1 mm, when the anchor is moved from its axial position wherein the barbed free end is caught in said catch 22 to its axial position wherein the anchor 7 is locked against said back surface in combination with said axial distance I being at most 8 mm and said radial distance w being at least 5 mm also leads to the catching action despite the small elasticity of the metal arms.

For the anchor use is indeed preferably made of a relatively rigid metal to provide the required tensile strength, in particular a tensile strength of at least 10 kN. In order to reduce the cost of the anchor, the metal is preferably not a spring metal but is preferably a metal which has not a high elasticity, and which has in particular not a yield strength higher than 400 MPa, preferably not a yield strength higher than 30 MPa and more preferably not a yield strength higher than 250 MPa. The yield strength of the metal of the anchor is however preferably higher than 50 MPa, more preferably higher than 100 MPa, advantageously higher than 150 MPa and more advantageously higher than 200 MPa so that the required stiffness of the arms can be achieved with a limited thickness thereof. The anchor is in particular made of a metal which has an elasticity such that when the barbed free ends of the anchor are each expanded over a distance of 2 mm from said longitudinal axis, they contract over at most 40%, in particular over at most 35% and more in particular over at most 30% of this distance when they are released. The free ends of the arms of the anchor for example each only contract for about 0.6 mm (i.e. the diameter of the anchor is reduced with 1.2 mm) when the anchor is removed from the splitter after having applied the fixture set onto a wall having a thickness of 2 mm.

The axial distance I is preferably larger than 3 mm and more preferably larger than 4 mm and is for example equal to about 5 mm. The radial distance w is preferably smaller than 12.5 mm, more preferably smaller than 10 mm and most preferably smaller than 7.5 mm and is for example equal to about 7 mm. With a radial distance w of 7 mm, the hole that needs to be drilled in the wall can be drilled with a drill bit of 15 mm, which is still quite easy and doesn't substantially reduce the strength of the post.

In view of the limited extent of contraction of the expanded arms, it has been surprisingly found that the above-described placement of the top 26, behind which the barbed free end 24 is caught, ensures that the metal arms 20 are able to partly radially contract due to the, albeit low, elasticity of the metal. This partial radial contraction is in particular due to the fact that the deformation of the metal anchor upon expansion comprises both an elastic and a plastic component, the radial contraction being the result of the elastic deformation.

Figure 11:
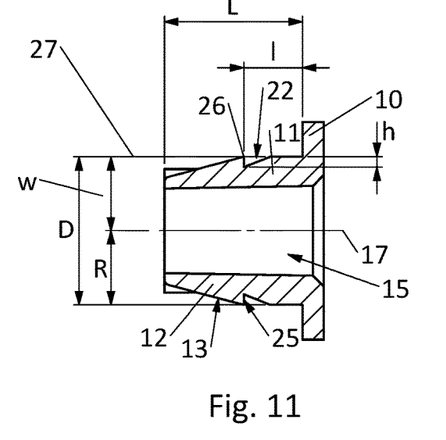
FIG. 11 shows an axial cross-section through the splitter along line XI in FIG. 10.
Figure 12:
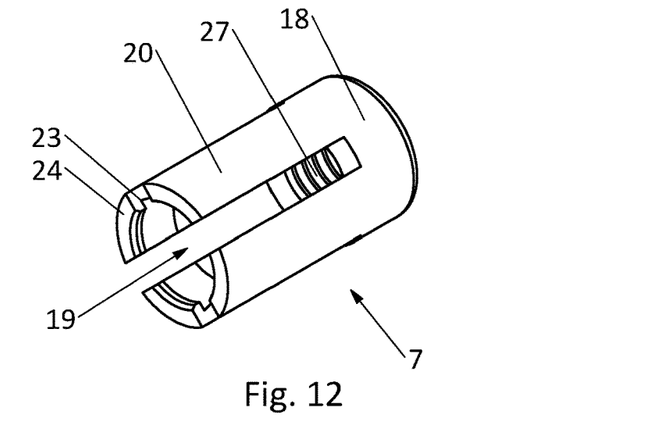
FIG. 12 shows a perspective views of the anchor of the fixture set of FIG. 1.
Figure 13:
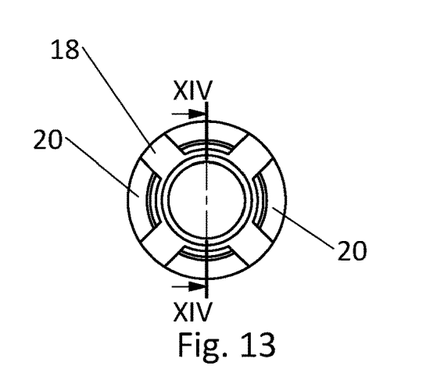
FIG. 13 shows a front view of the anchor of FIG. 12.

In preferred embodiments of the present invention, the radial distance w is at least 87% of the radius R of said minimum bounding cylinder 27, preferably at least 90% of the radius R of said minimum bounding cylinder, more preferably at least 92% of the radius R of said minimum bounding cylinder 27 and advantageously the radial distance w is equal to the radius R of said minimum bounding cylinder 27, in particular about 7 mm, as in FIG. 11. Furthermore, in some embodiments, the axial distance I is at least 15% of the length L of the splitter 6, preferably at least 25% of the length L, more preferably at least 30% of the length L and most preferably at least 35% of the length L, and in particular at most 50% of the length L, preferably at most 45% of the length L, the axial distance I being in particular about 5 mm. In such configurations the top 26 is located at or near the transition between the sleeve portion 11 and the wedge portion 12 which leaves sufficient room to accommodate the barbs on the arms 20 and walls 2 having a different thickness. In particular, the wall 2 may have a thickness between 0.5 and 5 mm, preferably between 1 and 3 mm and typically about 2 mm. Moreover, such a placement of the top 26 ensures that the arms 20 do not need to expand to such a degree in order to lock against the back surface of the wall 2 that the elastic component of the deformation is no longer sufficient to provide the needed partial radial contraction to interlock the barbed free end 24 with the catch 22.

Figure 16:
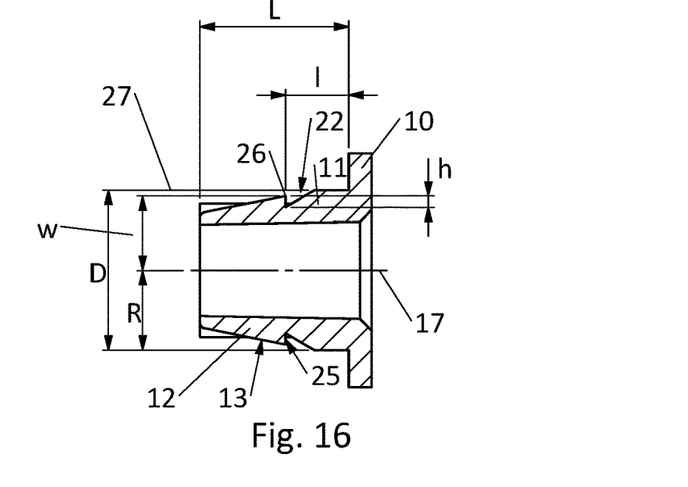
FIG. 16 shows an axial cross-section through the splitter along line XVI in FIG. 10.

In the illustrated embodiments, the catch 22 is formed by a discontinuous groove in the sleeve portion (see FIGS. 7 to 11) or a discontinuous groove in the wedge portion 12 (see FIG. 16). Alternatively, the groove may be a continuous circumferential groove. Such a continuous groove can be easily milled in the splitter 6. The entire splitter 6 may however be cast in case the splitter 6 is manufactured from a metal or a metal alloy or the splitter 6 may be injection moulded in case a plastic material is used to manufacture the splitter 6. Such a casting process was used to produce the splitters with discontinuous grooves illustrated in the drawings.

The groove preferably has a depth (which is equal to the height h of the wall 25) which is at least 0.25 mm, preferably at least 0.5 mm, advantageously at least 0.75 mm and more advantageously at least 0.9 mm. In the illustrated embodiments, the wall 25 has a height h which is equal to about 1.0 mm.

Figure 14:
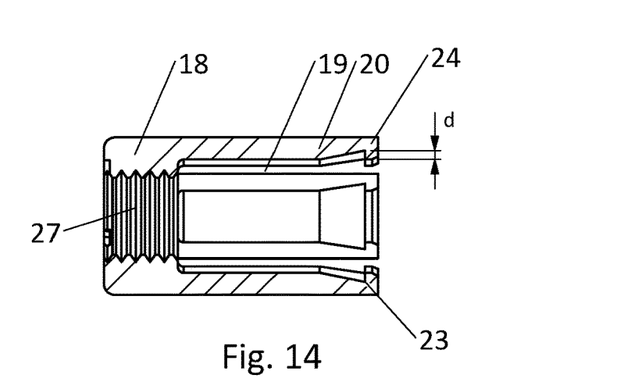
FIG. 14 shows an axial cross-section through the anchor along line XIV in FIG. 14.
Figure 15:
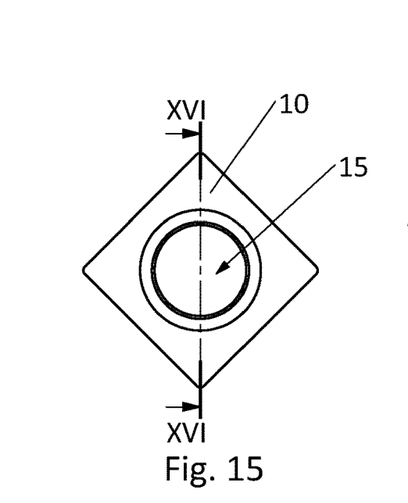
FIG. 15 shows a front view as in FIG. 7 of an alternative splitter.

In the illustrated embodiments, the barbs 23 on the free ends 24 of the arms 20 are formed by a notch, in particular a groove, which notch has a depth d (indicated in FIG. 14) which is at least 0.25 mm, preferably at least 0.5 mm, advantageously at least 0.75 mm and more advantageously at least 0.9 mm. In the illustrated embodiments, the notch has a depth d which is equal to about 1.0 mm. Again a groove is preferred as this is easy to mill into the formed metal anchor 7, which anchor is typically manufactured by milling from a stainless steel rod. It will be readily appreciated that the groove(s) forming the catch 22 and/or the barb 23 may in general be formed by a non-groove shaped recess and/or a notch.

The bolt 5 as shown in the appended figures typically has a diameter of between about 6 mm and about 10 mm and is preferably about 8 mm. Consequently, the diameter of the through-hole 15 is typically between 7 and 11 mm and preferably between 8 and 9 mm. Furthermore, the diameter D of the minimum bounding cylinder is preferably at most 25 mm, more preferably at most 20 mm and most preferably at most 15 mm.

Although aspects of the present disclosure have been described with respect to specific embodiments, it will be readily appreciated that these aspects may be implemented in other forms within the scope of the invention as defined by the claims.

The invention claimed is:

1. A fixture set for fixing an accessory part to a tubular metal profile having a wall, the wall having a front surface, a back surface and a circular opening therethrough, the fixture set comprising:
   a bolt having a bolt head and an at least partially threaded shaft configured to be inserted through the opening;
   a splitter having a longitudinal axis and sized to be partially axially insertable in said opening in a direction parallel to said longitudinal axis, the splitter comprising:
      a radially projecting portion configured to abut against said front surface;
      a sleeve portion extending axially away from said radially projecting portion and configured to fit within said opening, said sleeve portion having a minimum bounding cylinder;
      a wedge portion extending axially away from said sleeve portion and having at least two wedge surfaces which have a decreasing diameter away from said sleeve portion, the sleeve portion and the wedge portion having a total length measured parallel to said longitudinal axis between said radially projecting portion and a free end of said wedge portion; and
      a through-hole by which the splitter is configured to be slid onto the shaft of the bolt towards the bolt head in a first direction parallel to said longitudinal axis; and
   an integrally formed metal anchor sized to be axially insertable through said opening, the anchor comprising a threaded part configured to threadedly engage the bolt shaft thread, the anchor further comprising at least two radially expandable arms extending axially away from said threaded part and configured to slide along a respective one of said at least two wedge surfaces when said anchor is urged to slide in said first direction, said arms having a free end configured to lock the anchor against said back surface upon radial expansion of said arms, which radial expansion is caused by deformation of the metal anchor,
   the splitter and the anchor further comprising mutually interlockable structures for restricting rotation of said anchor relative to said splitter,
   wherein
   the splitter further comprises a catch situated entirely within said minimum bounding cylinder, said catch comprising a radially extending wall having a top which is separated from said radially projecting portion by an axial distance measured parallel to said longitudinal axis, said top being separated from said longitudinal axis by a radial distance measured perpendicular to said longitudinal axis, said axial distance being at most 60% of said total length and said radial distance being at least 85% of a radius of said minimum bounding cylinder, and
   the free end of a respective one of said at least two arms is a barbed free end, the barbed free end being configured to engage said radially extending wall when the anchor is urged to slide in a second direction, opposite to said first direction, after having slid said anchor onto said splitter in said first direction with said barbed free end having passed said catch.

2. A fixture set for fixing an accessory part to a tubular metal profile having a wall with a thickness between 0.5 mm and 5 mm, the wall having a front surface, a back surface and a circular opening therethrough, the fixture set comprising:
   a bolt having a bolt head and an at least partially threaded shaft configured to be inserted through the opening;
   a splitter having a longitudinal axis sized to be partially axially insertable in said opening in a direction parallel to said longitudinal axis, the splitter comprising:
      a radially projecting portion configured to abut against said front surface;
      a sleeve portion extending axially away from said radially projecting portion and configured to fit within said opening, said sleeve portion having a minimum bounding cylinder;
      a wedge portion extending axially away from said sleeve portion and having at least two wedge surfaces which have a decreasing diameter away from said sleeve portion, the sleeve portion and the wedge portion having a total length measured parallel to said longitudinal axis between said radially projecting portion and the free end of said wedge portion; and
      a through-hole by which the splitter is configured to be slid onto the shaft of the bolt towards the bolt head in a first direction parallel to said longitudinal axis; and
   an integrally formed metal anchor sized to be axially insertable through said opening the anchor comprising a threaded part configured to threadedly engage the bolt shaft thread, the anchor further comprising at least two radially expandable arms extending axially away from said threaded part and configured to slide along a respective one of said at least two wedge surfaces when said anchor is urged to slide in said first direction, said arms having a free end configured to lock the anchor against said back surface upon radial expansion of said arms, which radial expansion is caused by deformation of the metal anchor,
   the splitter and the anchor further comprising mutually interlockable structures for restricting rotation of said anchor relative to said splitter,
   wherein
   the splitter further comprises at least one catch situated entirely within said minimum bounding cylinder, said catch comprising a radially extending wall having a top which is separated from said radially projecting portion by an axial distance measured parallel to said longitudinal axis and from said longitudinal axis by a radial distance measured perpendicular to said longitudinal axis, said axial distance being at most 8 mm and said radial distance being at least 5 mm, and
   the free end of a respective one of said at least two arms is a barbed free end, the barbed free end being configured to engage said radially extending wall, when the anchor is urged to slide in a second direction, opposite to said first direction, after having slid said anchor onto said splitter in said first direction with said barbed free end having passed said catch, and
   when said wall has a thickness of about 2 mm, said splitter is configured to radially expand said barbed free end over a distance from said longitudinal axis of at most 1.5 mm when the anchor is moved from its axial position wherein the barbed free end is caught in said catch to its axial position wherein the anchor is locked against said back surface.

3. The fixture set according to claim 1, wherein said radial distance is at least 87% of the radius of said minimum bounding cylinder.

4. The fixture set according to claim 1, wherein said radial distance is equal to the radius of said minimum bounding cylinder.

5. The fixture set according to claim 1, wherein said axial distance is at least 15% of said total length, and said axial distance is at most 50% of said total length.

6. The fixture set according to claim 1, wherein when the anchor is urged to slide in said second direction, after having slid said anchor onto said splitter in said first direction with said barbed free end having passed said catch, and the arm having the barbed fee end is configured to partly radially contract.

7. The fixture set according to claim 1, wherein the anchor is made of a metal having elasticity such that when the barbed free ends of the anchor are each expanded over a distance of 2 mm from said longitudinal axis, the barbed free ends contract over at most 40% of the distance when released, wherein said metal is different from spring metal.

8. The fixture set according to claim 1, wherein said barbed free end is formed by a notch in said respective one of said at least two arms, said notch having a depth which is at least 0.25 mm.

9. The fixture set according to claim 1, wherein said top is located proximate to a transition between said sleeve portion and said wedge portion.

10. The fixture set according to claim 1, the splitter further comprising a second catch situated entirely within said minimum bounding cylinder and comprising a radially extending wall having a top which is separated from said radially projecting portion by an axial distance measured parallel to said longitudinal axis, said top being separated from said longitudinal axis by a radial distance measured perpendicular to said longitudinal axis, said axial distance being at most 60% of said total length, said radial distance being at least 85% of the radius of said minimum bounding cylinder.

11. The fixture set according to claim 1, wherein said mutually interlockable structures comprise a radially extended ridge on said wedge portion between said at least two wedge surfaces, said at least two arms of said anchor being guided by said ridge.

12. The fixture set according to claim 2, wherein said radial distance is at least 87% of the radius of said minimum bounding cylinder.

13. The fixture set according to claim 2, wherein said radial distance is equal to the radius of said minimum bounding cylinder.

14. The fixture set according to claim 2, wherein said axial distance is at least 15% of said total length, and said axial distance is at most 50% of said total length.

15. The fixture set according to claim 2, wherein when the anchor is urged to slide in said second direction, after having slid said anchor onto said splitter in said first direction with said barbed free end having passed said catch, and the arm having the barbed fee end is configured to partly radially contract.

16. The fixture set according to claim 2, wherein the anchor is made of a metal having elasticity such that when the barbed free ends of the anchor are each expanded over a distance of 2 mm from said longitudinal axis, the barbed free ends contract over at most 40% of the distance when released, wherein said metal is different from spring metal.

17. The fixture set according to claim 2, wherein said barbed free end is formed by a notch in said respective one of said at least two arms, said notch having a depth which is at least 0.25 mm.

18. The fixture set according to claim 2, wherein said top is located proximate to a transition between said sleeve portion and said wedge portion.

19. The fixture set according to claim 2, the splitter further comprising a second catch situated entirely within said minimum bounding cylinder and comprising a radially extending wall having a top which is separated from said radially projecting portion by an axial distance measured parallel to said longitudinal axis, said top being separated from said longitudinal axis by a radial distance measured perpendicular to said longitudinal axis, said axial distance being at most 60% of said total length, said radial distance being at least 85% of the radius of said minimum bounding cylinder.

20. The fixture set according to claim 2, wherein said mutually interlockable structures comprise a radially extended ridge on said wedge portion between said at least two wedge surfaces, said at least two arms of said anchor being guided by said ridge.

* * * * *